US 7,960,006 B2

(12) United States Patent
Shingai et al.

(10) Patent No.: US 7,960,006 B2
(45) Date of Patent: Jun. 14, 2011

(54) OPTICAL RECORDING MEDIUM AND RECORDING FILM MATERIAL

(75) Inventors: Hiroshi Shingai, Tokyo (JP); Tatsuya Kato, Tokyo (JP); Masanori Kosuda, Tokyo (JP); Hiroshi Takasaki, Tokyo (JP); Hideki Hirata, Tokyo (JP); Hajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 574 days.

(21) Appl. No.: 12/010,163

(22) Filed: Jan. 22, 2008

(65) Prior Publication Data
US 2008/0175125 A1 Jul. 24, 2008

(30) Foreign Application Priority Data

Jan. 23, 2007 (JP) ................. 2007-013138
Dec. 28, 2007 (JP) ................. 2007-341231

(51) Int. Cl.
*B32B 3/02* (2006.01)

(52) U.S. Cl. .............. 428/64.1; 428/64.4; 428/64.5; 428/64.6; 430/270.13

(58) Field of Classification Search .............. None
See application file for complete search history.

(56) References Cited

U.S. PATENT DOCUMENTS

| 7,001,655 | B2* | 2/2006 | Kiyono et al. ............. 428/64.1 |
| 2004/0166440 | A1* | 8/2004 | Tabata et al. ............ 430/270.13 |
| 2005/0074694 | A1* | 4/2005 | Nishihara et al. ........ 430/270.13 |
| 2007/0148395 | A1* | 6/2007 | Shingai et al. ............. 428/64.4 |

FOREIGN PATENT DOCUMENTS

JP B2 389970 1/2007

* cited by examiner

*Primary Examiner* — Elizabeth Mulvaney
(74) *Attorney, Agent, or Firm* — Oliff & Berridge, PLC

(57) ABSTRACT

A next-generation optical recording medium has two or more information layers which include a translucent information layer. The translucent information layer has a recording film and an interface layer, provided adjacent to the recording film on the side of the light incident surface. The recording film is made of a phase change material having $Sb_xTe_yGe_z$ elements and elemental ratios. Y satisfies $5 \leq y \leq 15$ and z satisfies $5 \leq z \leq 15$. When In having an elemental ratio of a is further added and $x+y+z+a=100$ holds, a satisfies $4 \leq a \leq 15$. The interface layer comprises of $ZrO_2$—$Cr_2O_3$ film thickness of which is in a range of from 2 nm to 10 nm. When $ZrO_2$:$Cr_2O_3$=C:D (mol %), the compositional ratios $ZrO_2$ and $Cr_2O_3$ in the $ZrO_2$—$Cr_2O_3$ film, holds, the C satisfies $20 \leq C \leq 90$, and the D satisfies $10 \leq D \leq 80$, and the C and the D satisfy C+D=100. The $ZrO_2$ is stabilized $ZrO_2$ which contains $Y_2O_3$, when $ZrO_2$:$Y_2O_3$=(100−X):X (mol %), the compositional ratios $ZrO_2$ and $Y_2O_3$ in the stabilized $ZrO_2$, holds, the X satisfies $2 \leq X \leq 10$.

17 Claims, 2 Drawing Sheets

The relationship between the amount (a) of In and the amount (x) of Sb $y = -0.7129x + 80.09$
$R^2 = 0.999$ The relationship between the amount (a) of In and the amount (x) of Sb $R^2 = 0.999$

OPTICAL RECORDING MEDIUM AND RECORDING FILM MATERIAL

BACKGROUND OF THE INVENTION

1. Field of the Invention

The present invention relates to an optical recording medium so-called as a next-generation DVD (digital versatile disc), and in particular, to an optical recording medium having two or more information layers made of a phase change material and a recording film material for the optical recording medium.

2. Description of the Related Art

A Blu-ray (registered trademark) Disc (hereinafter referred to as a BD) which uses an optical system where the wavelength of the recording and reproduction laser is 405 nm (blue) and the numerical aperture NA of the objective lens is 0.85 ($\lambda$/NA$\leq$650 nm) has been proposed as a next-generation DVD.

In an optical disc drive for such a BD, as a standard in reproduction, the reproduction light is modulated at a High Frequency Modulation being a few hundred MHz in an optical pickup using a single mode oscillation semiconductor laser diode in order to reduce laser noise during signal reproduction.

The general conditions of High Frequency Modulation are determined to be a frequency in a range of from 300 MHz to 500 MHz, a ratio in a range of from 3.0 to 8.0, and a pulse width in a range of from 200 to 400 psec.

In the BD, on the other hand, a rewritable optical recording medium having two information layers on one side is proposed. In the dual-layer optical recording medium, an L1 layer except for an information layer (L0 layer), which is the farthest away from a light incident surface, is translucent in order to allow recording and reproduction light to pass therethrough.

Since the amount of light reflected from such a translucent L1 layer during reproduction is small, it is necessary to increase laser power used during reproduction. Also, the BD uses laser light with a short wavelength and the resultant spot size is small when compared with that of a conventional DVD, so that the energy density at the laser spot becomes extremely high.

Accordingly, the next-generation DVD with two or more layers has a problem in that the irradiation of laser light with a high reproduction power reduces the reproduction durability of the recording signal because, in particular, the layer(s) excluding the L0 layer exhibit low radiation performance.

In particular, the rewritable phase change optical recording medium has a problem in that the irradiation of laser light with a high reproduction power during reproduction crystallizes an amorphous mark (being a recording signal) and tends to erase the recording signal. This problem is particularly notable in a phase change material such as an Sb-based eutectic system having Sb as the main composition.

Thus, it has been difficult to date to use an Sb-based eutectic material in the recording film of a translucent information layer of a rewritable multilayer optical recording medium of a BD.

Furthermore, when the Sb-based eutectic material is used in the recording film of the translucent information layer of a rewritable multilayer BD, as described above, there is a problem in that the margin for the recording strategy becomes narrow as follows.

The Sb-based eutectic material can easily increase the crystallization rate of the recording film. When forming the amorphous mark using recording laser light, however, a high cooling rate is necessary. If the cooling rate is insufficient, recrystallization occurs during cooling which occurs after the melting of the recording film so that the amorphous mark is formed in an unsatisfactory manner.

Therefore, it is necessary to either make the structure of the optical recording medium capable of being rapidly cooled or narrow the pulse width used in the recording strategy for forming the amorphous mark in order to prevent the occurrence of any residual heat during recording.

In the translucent information layer of a dual-layer BD, however, the recording film or reflective film has to be thin enough to allow the recording and reproduction light to pass therethrough. Thus, the dispersal of any residual heat is insufficient and the slow cooling structure of the layer when compared with the information layer (being the L0 layer) of total reflection means that an amorphous mark is not satisfactorily formed.

Furthermore, since it takes approximately 1.5 nsec to 3 nsec of rise and fall time to emit laser light, even if the pulse width of the laser pulse is set to be shorter than the aforementioned emission time, the laser light cannot be emitted. Thus, it is essential that amorphous marks are formed on the recording film with a recording pulse width that is wider than that detailed above.

However, since the Sb-based eutectic material requires a high cooling rate, as described above, the recrystallization occurs when amorphous marks are formed with a recording strategy having a wide pulse width, so that it is difficult to correctly form amorphous marks. In Japanese Patent No. 3899770, they say that it is possible to fit the optical recording media to wide range of linear velocity and to make a amorphous mark stable by using the SbTe-based eutectic material as the recording film. But the invention mentioned in Japanese Patent No. 3899770 could hardly substantialize reproduction durability at high laser power during reproduction using an optical system of $\lambda$/NA$\leq$650 nm.

SUMMARY OF THE INVENTION

In view of the foregoing problems, various exemplary embodiments of this invention provide a next-generation optical recording medium having good reproduction durability and a good recording strategy margin even if an Sb-based eutectic material is used in a translucent information layer using a recording condition of $\lambda$/NA$\leq$650 nm for use in a next-generation DVD, and a recording film material for used in that optical recording medium.

As a result of intensive studies, the inventor has found that when a material in which In is substituted for part of the Sb in an Sb-based eutectic material is used as the recording film material of a translucent information layer of a next-generation optical recording medium having two or more information layers, and when a layer adjacent to a recording film contains at least Cr and O, and when thickness of every layer which composes a optical recording medium is fixed appropriately, an amorphous mark which is resistant to crystallizing and has good reproduction durability is formed. The inventor has also found that the amorphous mark is easily formed and the recording strategy margin is widened accordingly.

In summary, the above-described objectives are achieved by the following embodiments of the present invention.

(1) An optical recording medium comprising: a substrate; a first information layer which is provided on the substrate on a side of a light incident surface on which a laser beam is incident; and at least one translucent information layer which is provided further on the side of the light incident surface than the first information layer, wherein the translucent information layer comprises a recording film which is made of a phase change material having $Sb_xTe_yGe_z$ elements and specific elemental ratios, wherein the y holds $5 \leq y \leq 15$, z holds $5 \leq z \leq 15$, wherein NA represents the numerical aperture of an objective lens, and λ represents a wavelength of the laser beam, the recording film is rewritable using an optical system of $λ/NA \leq 650$ nm, and wherein, when x+y+z+a=100 holds by adding In with an elemental ratio of a, $4 \leq a \leq 15$ holds.

(2) The optical recording medium according to (1), wherein when $77 \leq b \leq 84$ holds, the elemental ratios x and a satisfy x=−0.713×a+b.

(3) The optical recording medium according to (1) or (2), wherein the recording film has a thickness in a range of from 3 nm to 7 nm both inclusive.

(4) The optical recording medium according to any one of (1) to (3), wherein the translucent information layer comprises a reflective layer provided on an opposite side of a light incident surface of the recording film and the reflective layer has a thickness in a range of from 8 nm to 16 nm both inclusive.

(5) The optical recording medium according to any one of (1) to (4), wherein the translucent information layer comprises an interface layer provided adjacent to the recording film on the side of the light incident surface and the interface layer contains at least Cr and O.

(6) The optical recording medium according to any one of (1) to (5), wherein the translucent information layer contains a heat sink layer, a dielectric layer, the interface layer, and the recording film and comprises their stacked in this order from the light incident surface, and the heat sink layer comprises an AlN film.

(7) The optical recording medium according to (5) or (6), wherein the interface layer is made of $ZrO_2$—$Cr_2O_3$ film, and the $ZrO_2$—$Cr_2O_3$ film has a thickness in a range of from 2 nm to 10 nm both inclusive.

(8) The optical recording medium according to (7), wherein when $ZrO_2$:$Cr_2O_3$=C:D (mol %), the compositional ratios $ZrO_2$ and $Cr_2O_3$ in the $ZrO_2$—$Cr_2O_3$ film, holds, the C satisfies $20 \leq C \leq 90$, and the D satisfies $10 \leq D \leq 80$, and the C and the D satisfy C+D=100.

(9) The optical recording medium according to (7) or (8), wherein the $ZrO_2$ is stabilized $ZrO_2$ which contains $Y_2O_3$, when $ZrO_2$:$Y_2O_3$=(100−X):X (mol %), the compositional ratios $ZrO_2$ and $Y_2O_3$ in the stabilized $ZrO_2$, holds, the X satisfies $2 \leq X \leq 10$.

(10) An optical recording medium comprising: a substrate; a first information layer which is provided on the substrate on a side of a light incident surface on which a laser beam is incident; and at least one translucent information layer which is provided further on the side of said light incident surface than the first information layer, wherein the translucent information layer comprises: a recording film which is rewritable using an optical system of $λ/NA \leq 650$ nm when NA represents the numerical number of an objective lens and λ represents a wavelength of the laser beam; and a protective layer adjacent to the recording film on the side of the substrate side, and wherein the recording film is made of an Sb-based eutectic phase change material having Sb as a main composition and the protective layer contains at least Cr and O.

(11) A recording film material comprising a phase change material having $Sb_xTe_yGe_z$ elements and elemental ratios in which y satisfies $5 \leq y \leq 15$ and z satisfies $5 \leq z \leq 15$, the recording film material for making a recording film which is rewritable using an optical system of $λ/NA \leq 650$ nm when NA represents the numerical number of an objective lens and λ represents a wavelength of a laser beam, wherein when In having an elemental ratio of a is further added and x+y+z+a=100 holds, the a satisfies $4 \leq a \leq 15$.

In an optical recording medium according to the present invention, substituting In for part of the Sb in an Sb-based eutectic material used as a recording film material, and making a layer adjacent to a recording film contain at least Cr and O, and fixing appropriately thickness of every layer which composes a optical recording medium makes it possible to realize a translucent information layer with good reproduction durability and a good recording strategy margin in which information can be recorded at high speed.

DETAILED DESCRIPTION OF THE PREFERRED EMBODIMENTS

Figure 1:
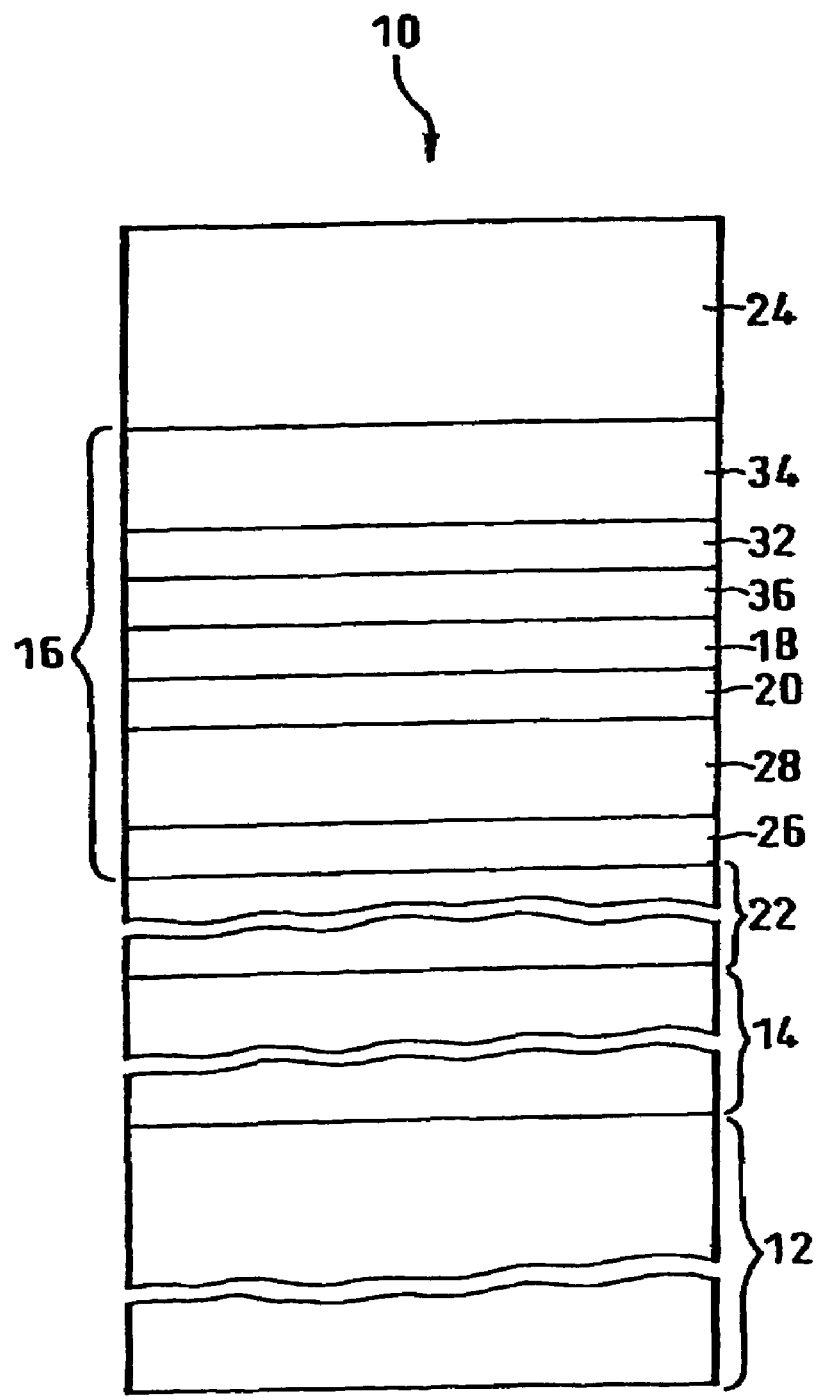
FIG. 1 is a sectional view which schematically shows an optical recording medium according to a first exemplary embodiment of the present invention.

An optical recording medium according to a best mode has a substrate, a first information layer (being an L0 layer) which is provided on the substrate on the side of a light incident surface on which a laser beam is incident, and at least one translucent information layer (being an L1 layer) which is provided further on the side of the light incident surface than the first information layer. The translucent information layer is configured to include a recording film which is made of a recording film material having $Sb_xTe_yGe_z$ elements and specific elemental ratios. The recording film material is a phase change material. When the aforementioned y holds $5 \leq y \leq 15$, z holds $5 \leq z \leq 15$, NA represents the numerical aperture of an objective lens, and λ represents the wavelength of the laser beam, the recording film can be rewritten using an optical system of $λ/NA \leq 650$ nm. Furthermore, when x+y+z+a=100 holds by adding In with an elemental ratio of a, $4 \leq a \leq 15$ holds.

A structural example of the translucent information layer includes a first dielectric layer, a reflective layer, a protective layer, a recording film (layer), a interface layer, a second dielectric layer, and a heat sink layer, which are laminated in this order on the side of the substrate.

The first dielectric layer is provided for protecting the reflective layer and adjusting light transmittance. The material of the first dielectric layer is not limited to particular ones, and can include oxide, nitride, sulfide, carbide, and fluoride containing at least one kind of metal selected from Ti, Zr, Hf, Ta, Si, Al, Mg, Y, Ce, Zn, In, Cr, Nb, and the like, and a composite thereof. In the best exemplary embodiment, the first dielectric layer is made of a material which contains a zirconium oxide ($ZrO_2$) as a main composition, and is preferably made of $ZrO_2$, $Cr_2O_3$, and $Al_2O_3$. In this instance, the main composition occupies a molar ratio of 50% or more in the entire components. It is preferable that the thickness $D_1$ of the first dielectric layer be 5 nm$\leq D_1 \leq$60 nm. If the thickness is less than 5 nm, the reflective layer is not protected sufficiently. If the thickness is more than 60 nm, the light transmittance is out of a preferable range. The first dielectric layer may be composed of a lamination of a plurality of dielectric layers.

The reflective layer is provided for radiation and for achieving a light interference effect. The material of the reflective layer is preferably an Ag alloy. The thickness Tr of the reflective layer for making the information layer of translucent structure is 0 nm<Tr<30 nm, and preferably 8 nm≦Tr≦16 nm in order to obtain optimal reflectivity and light transmittance. If the thickness Tr of the reflective layer is 0 nm, a radiation effect cannot be obtained. If the thickness Tr is 30 nm or more, the light transmittance is reduced, and accordingly, it becomes difficult to form amorphous marks on the L0 layer.

The protective layer protects the recording film and controls the cooling rate. The material of the protective layer contains at least Cr and O, and preferably Cr, Zr and O, and more preferably at least $ZrO_2$ and $Cr_2O_3$. $Cr_2O_3$ is for increasing the crystallization rate, and $ZrO_2$ is for decreasing the film stress. If the compositional ratio of $Cr_2O_3$ is high, it is easy to increase the crystallization rate. But if the compositional ratio of $Cr_2O_3$ is too high, the light transmittance is reduced. The preferable ratio of $Cr_2O_3$ for composing the protective layer, is in the range from 30 mol % to 80 mol % both inclusive. The preferable ratio of $ZrO_2$ for composing the protective layer, is in the range from 20 mol % to 60 mol % both inclusive. The preferable $ZrO_2$ is a stabilized $ZrO_2$ which includes rare-earth oxide in a few mol %. The preferable rare-earth oxide is $Y_2O_3$. The compositional ratio of the stabilized $ZrO_2$ is in the range from 2 mol % to 10 mol % both inclusive when the stabilized $ZrO_2$ is 100 mol %.

The preferable thickness Trec of the recording film (layer) is 3 nm≦Trec≦7 nm. If the thickness Trec is less than 3 nm, crystallization rate is reduced, and therefore, it becomes difficult to erase (crystallize) an amorphous mark. If the thickness Trec is more than 7 nm, the transmittance is reduced, and therefore, it becomes difficult to form amorphous marks on the L0 layer. Also, when the recording film is thick, excessive heat accumulated in the recording film itself during recording degrades the recording characteristics.

Accordingly, the light transmittance of the entire translucent information layer at a recording wavelength is set to be in the range of from 30% to 80% both inclusive. If the light transmittance of the translucent information layer is less than 30%, it becomes difficult to form amorphous marks on the information layer which is the farthest away from the light incident surface. If the light transmittance exceeds 80%, it becomes difficult to form amorphous marks on the translucent information layer. This is a general condition required for the translucent information layer.

The recording film (layer) is made of at least Sb, Te, and Ge. In is substituted for part of the Sb. Furthermore, the recording film (layer) may contain at least one kind of additive composition selected from Mg, Al, Si, Mn, Zn, Ga, Sn, Bi, and the like.

The interface layer controls the crystallization rate and the reproduction durability of the recording film. The material of the interface layer includes at least Zr, Cr and O, and preferably $ZrO_2$ and $Cr_2O_3$. $Cr_2O_3$ can increase the crystallization rate and the reproduction durability and $ZrO_2$ can increase the transparency of the film. If the compositional ratio of $Cr_2O_3$ is too high, the transparency of the film is reduced and light transmittance of the translucent information layer is reduced. If the compositional ratio of $ZrO_2$ is too high, the crystallization rate and the reproduction durability is reduced. The preferable ratio of $Cr_2O_3$ for composing the interface layer is in the range of from 10 mol % to 80 mol % both inclusive and the preferable ratio of $ZrO_2$ is in the range of from 20 mol % to 90 mol % both inclusive. The preferable $ZrO_2$ is a stabilized $ZrO_2$ which includes rare-earth oxide in a few mol %. The preferable rare-earth oxide is $Y_2O_3$. The compositional ratio of the stabilized $ZrO_2$ is in the range from 2 mol % to 10 mol % both inclusive when the stabilized $ZrO_2$ is 100 mol %.

The second dielectric layer adjusts the optical characteristics and controls the radiation from the recording film to the heat sink layer. The material of the second dielectric layer is not limited to particular ones, and can include oxide, nitride, sulfide, carbide, and fluoride containing at least one kind of metal selected from Ti, Zr, Hf, Ta, Si, Al, Mg, Y, Ce, Zn, In, Cr, Nb, and the like, and a composite thereof. The second dielectric layer is preferably made of a mixture of ZnS and $SiO_2$. The preferable molar ratio between ZnS and $SiO_2$ is 50:50 to 95:5 (mol %). If the molar ratio is out of this range, an index of refraction of the mixture of ZnS and $SiO_2$ varies so that it becomes difficult to adjust the optical characteristics. It is preferable that the thickness $D_2$ of the second dielectric layer be 5 nm≦$D_2$≦50 nm. If the thickness $D_2$ is thinner than 5 nm, it becomes difficult to protect the recording film and adjust the optical characteristics. If the thickness $D_2$ is thicker than 50 nm, the radiation characteristic from the recording film to the heat sink layer deteriorates.

The heat sink layer for controlling radiation from the recording film can increase the cooling effect of the recording film in order to easily form an amorphous mark with precision. The material of the heat sink layer is not especially limited, but a material with higher thermal conductivity than that of the second dielectric layer is preferable, which includes AlN, SiN, BN, $Al_2O_3$, $TiO_2$, and the like. In the best exemplary embodiment, the heat sink layer is made of AlN. The preferable thickness Theat of the heat sink layer is 15 nm≦Theat≦150 nm. If the thickness Theat of the heat sink layer is less than 15 nm, a radiation effect from the recording film is reduced. If the thickness Theat of the heat sink layer is more than 150 nm, it takes long time to form the layer and productivity is reduced.

Each of the first and second dielectric layers may be composed of a single layer or a plurality of dielectric layers.

In an optical disc drive for the optical recording medium to record and reproduction, the reproduction light is modulated at a High Frequency Modulation being a few hundred MHz in an optical pickup using a single mode oscillation semiconductor laser diode in order to reduce laser noise during signal reproduction. The general conditions of High Frequency Modulation are determined to be a frequency in a range of from 300 MHz to 500 MHz, a ratio in a range of from 3.0 to 8.0, and a pulse width in a range of from 200 to 400 psec. The preferable conditions of High Frequency Modulation in a BD with two or more information layers at high frequency or determined to be a reproduction power of 0.7 mW or more, a frequency of 360 MHz or more, a ratio of 6.3 or more, and a pulse width of 270 psec or more. If the conditions are determined to be lower than the preferable conditions, characteristics of the reproduced signal degenerate because of laser noise which is caused by the laser light which returns to laser diode. And the higher limit of the condition of High Frequency Modulation is a frequency of 500 MHz, a ratio of 8.0, and a pulse width of 350 psec because of the restriction of the circuit of High Frequency Modulation.

First Exemplary Embodiment

Referring to FIG. 1, an optical recording medium 10 according to a first exemplary embodiment of the present invention will be hereinafter described in detail.

The optical recording medium 10 is configured to include a substrate 12, a first information layer 14 provided on the substrate 12 on the side of a light incident surface (upside in FIG. 1) on which a laser beam is incident, and a second information layer 16 being a translucent information layer provided further on the side of the light incident surface than the first information layer 14. The second information layer (being a translucent information layer) 16 includes a recording film 18 and an interface layer 36, provided adjacent to the recording film 18 on the side of the light incident surface and a protective layer 20 provided adjacent to the recording film 18 on the side of the substrate 12.

A spacer layer 22 is provided between the first information layer 14 and the second information layer (the translucent information layer) 16. A cover layer 24 is provided on the second information layer (the translucent information layer) 16 on the side of the light incident surface.

The second information layer (the translucent information layer) 16 is configured to include a first dielectric layer 26 made of a ZrO$_2$—Cr$_2$O$_3$—Al$_2$O$_3$ (65:10:25 mol %) film with a thickness of 5 nm, a reflective layer 28 made of an AgCu film with a thickness of 12 nm, the protective layer 20 made of a ZrO$_2$—Cr$_2$O$_3$ (50:50 mol %) film with a thickness of 4 nm, the recording film 18 made of a phase change material in an Sb eutectic system having Sb as the main composition with a thickness of 6 nm, the interface layer 36 made of a ZrO$_2$—Y$_2$O$_3$—Cr$_2$O$_3$ (48.5:1.5:50 mol %) film with a thickness of 5 nm, a second dielectric layer 32 made of a ZnS—SiO$_2$ (80:20 mol %) film with a thickness of 13 nm, and a heat sink layer 34 made of an AlN film with a thickness of 45 nm, which are formed in this order from the spacer layer 22 side by sputtering.

The substrate 12 is made of polycarbonate having a thickness of 1.1 mm. The spacer layer 22 has a thickness of 25 μm. The cover layer 24 is made of a UV-curable resin having a thickness of 75 μm provided by spin coating. The cover layer 24 is formed after an initializing device has crystallized the entire surface of the second information layer.

Samples 1 to 11 of the optical recording medium having the aforementioned conditions were manufactured using sputtering targets having compositions shown in Table 1 as a recording film material for composing the recording film 18.

TABLE 1

|  | x | y | z | a | b |
|---|---|---|---|---|---|
| Sample 1 | 76.8 | 9.0 | 9.4 | 4.8 | 80.1 |
| Sample 2 | 74.4 | 8.6 | 9.1 | 7.9 | 80.1 |
| Sample 3 | 73.0 | 8.1 | 9.0 | 9.9 | 80.1 |
| Sample 4 | 71.1 | 7.6 | 8.8 | 12.5 | 80.1 |
| Sample 5 | 80.0 | 10.0 | 10.0 | 0.0 | 80.1 |
| Sample 6 | 78.0 | 9.5 | 9.5 | 3.0 | 80.1 |
| Sample 7 | 69.0 | 7.1 | 8.7 | 15.2 | 80.1 |
| Sample 8 | 82.6 | 0.0 | 12.3 | 5.1 | 86.2 |
| Sample 9 | 71.0 | 16.5 | 6.7 | 5.8 | 75.0 |
| Sample 10 | 79.7 | 0.0 | 15.2 | 5.1 | 83.3 |
| Sample 11 | 90.2 | 0.0 | 4.7 | 5.1 | 93.8 |

In Table 1, x, y, z, and a are values indicating the elemental ratios of Sb, Te, Ge, and In, respectively. When the elements and elemental ratios of the optical recording medium are represented by (Sb$_x$Te$_y$Ge$_z$)+In$_a$, x+y+z+a=100 holds. Also, the relationship between the amount (a) of In and the amount (x) of Sb can be expressed by the following equation.

$$x=-0.713 \times a + b$$

Figure 2:
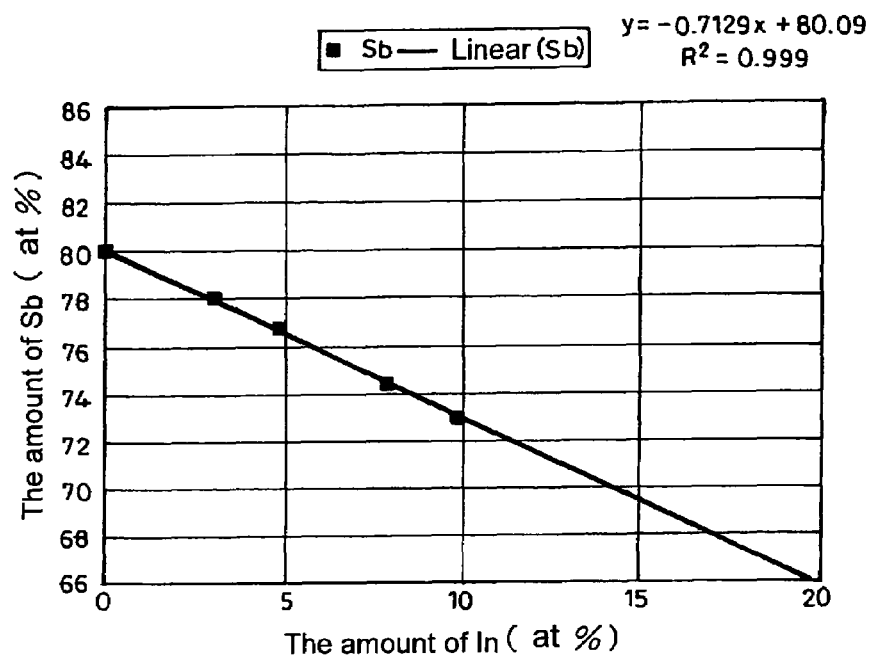
FIG. 2 is a graph which shows the relationship between the amount (a) of In and the amount (x) of Sb in a translucent information layer used in the optical recording medium according to the first exemplary embodiment of the present invention when b=80.09.

The value of b in the aforementioned equation corresponds to b shown in Table 1. FIG. 2 shows a graph showing the relationship between the amount (a) of In and the amount (x) of Sb when b=80.09 in the aforementioned equation. In FIG. 2, a horizontal axis corresponds to the amount (a) of In and a vertical axis corresponds to the amount (x) of Sb. The value of b can be arbitrary decided.

These samples will be described. The samples 1 to 4 are within the ranges of 5≦y≦15, 5≦z≦15, and 4≦a≦15, and the ratio of In has a relationship of sample 1<sample 2<sample 3<sample 4. Furthermore, b=80.1 holds. The samples 5 and 6 are within the ranges of 5≦y≦15 and 5≦z≦15, but a<4 holds. Furthermore, b=80.1 holds. In the sample 5, a=0.0 holds, in other words, the sample 5 does not contain In. The sample 7 is within the ranges of 5≦y≦15 and 5≦z≦15, but 15<a holds. Furthermore, b=80.1 holds. The sample 8 is within the ranges of 5≦z≦15 and 4≦a≦15, but y=0.0 holds. In other words, the sample 8 does not contain Te. Furthermore, b=86.2 holds. The sample 9 is within the ranges of 5≦z≦15 and 4≦a≦15, but 15<y holds. Furthermore, b=75 holds. The sample 10 is within the ranges of 4≦a≦15, but 15<z and y=0.0 holds. In other words, the sample 10 does not contain Te. Furthermore, b=83.3 holds. The sample 11 is within the ranges of 4≦a≦15, but z<5 and y=0.0 holds. In other words, the sample 11 does not contain Te. Furthermore, b=93.8 holds. Table 2 shows these relationships. In Table 2, a circle indicates the cases within the ranges of 5≦y≦15, 5≦z≦15, and 4≦a≦15, and a cross indicates the cases out of the ranges.

TABLE 2

|  | 5 ≦ y ≦ 15 | 5 ≦ z ≦ 15 | 4 ≦ a ≦ 15 |
|---|---|---|---|
| Sample 1 | ○ | ○ | ○ |
| Sample 2 | ○ | ○ | ○ |
| Sample 3 | ○ | ○ | ○ |
| Sample 4 | ○ | ○ | ○ |
| Sample 5 | ○ | ○ | x |
| Sample 6 | ○ | ○ | x |
| Sample 7 | ○ | ○ | x |
| Sample 8 | x | ○ | ○ |
| Sample 9 | x | ○ | ○ |
| Sample 10 | x | x | ○ |
| Sample 11 | x | x | ○ |

In order to evaluate these samples, recording was carried out using an optical system with λ=405 nm, NA=0.85 and a (1,7) RLL (Run Length Limited) signal. The linear velocity used during recording and reproduction is 1× speed=4.92 m/s and 2× speed=9.84 m/s.

Recording is carried out at a linear velocity of 9.84 m/s at 2× speed of BD-RE. In order to erase any recorded mark at the 2× speed, it is necessary that the linear velocity (being the crystallization rate) of the medium be within a certain range. If the linear velocity of the medium is slower than that range, a recorded mark cannot be erased. If the linear velocity of the medium is too fast, an amorphous mark is difficult to form by re-crystallization after melting of the recording film. Thus, the linear velocity of the medium has to be in the range of from 10 m/s to 18 m/s. The linear velocity was evaluated by obtaining the linear velocity of the medium.

An 8T single mark was recorded at 1× or 2× speed and DC erasure was then carried out once at an erasure power of 4 mW while varying the linear velocity in order to obtain the erasability of the 8T mark. The linear velocity of this medium was set as the maximum erasing linear velocity that fell within the range in which the erasability became 25 dB or more. For the sample on which recording could not be carried out, "recording impossible" was entered in the linear velocity LV section of the associated table. "Recording impossible" means that a mark is difficult to form because crystallization rate is too fast, or in other words, the linear velocity of the medium is too fast. With reference to Table 5, it was found that samples 1 to 4 in which the composition of the recording film material was within the ranges of $5 \leq y \leq 15$, $5 \leq z \leq 15$, and $4 \leq a \leq 15$ exhibited favorable jitter values. Table 3 shows results. In Table 3, as described above, a circle indicates a sample having a linear velocity in the range of from 10 m/s to 18 m/s, and a cross indicates a case in which the linear velocity is beyond the aforementioned range or recording cannot be carried out.

TABLE 3

|  | Linear velocity | |
| --- | --- | --- |
|  | LV(m/s) | Evaluation |
| Sample 1 | 15.0 | ○ |
| Sample 2 | 14.0 | ○ |
| Sample 3 | 11.5 | ○ |
| Sample 4 | 10.0 | ○ |
| Sample 5 | 15.0 | ○ |
| Sample 6 | 14.5 | ○ |
| Sample 7 | 7.7 | x |
| Sample 8 | 13.5 | ○ |
| Sample 9 | 5.0 | x |
| Sample 10 | 8.4 | x |
| Sample 11 | Recording impossible | x |

According to Table 3, it was found that in at least samples 1 to 6, or in other words, when the composition of the recording film material was within the ranges of $5 \leq y \leq 15$, $5 \leq z \leq 15$, and $a \leq 15$, the linear velocity was within the range of from 10 m/s to 18 m/s.

Reproduction durability was then evaluated. The conditions of High Frequency Modulation of the reproduction light were determined to be a reproduction power of 0.7 mW, a frequency of 400 MHz, a ratio of 6.5, and a pulse width of 270 psec. A signal was recorded at 2x speed and the signal was then reproduced at 1x speed in order to measure the jitter. Reproduction at 2x speed was then carried out ten thousand times with a varying reproduction power Pr, and the jitter was measured for a final time during reproduction at 1x speed in order to investigate the amount of change in the jitter. Table 4 shows the amount of degradation in jitter when reproduction was carried out ten thousand times at a reproduction power Pr=1.0 mW. In Table 4, a circle indicates a sample that does not exhibit any degradation in jitter when reproduction at 2x speed was carried out ten thousand times at a reproduction power Pr=0.7 mW, and a cross indicates a sample exhibiting jitter degradation.

TABLE 4

|  | Reproduction durability | |
| --- | --- | --- |
|  | The amount of degradation in jitter(%) | Evaluation |
| Sample 1 | 0.8 | ○ |
| Sample 2 | 0.4 | ○ |
| Sample 3 | 0.0 | ○ |
| Sample 4 | 0.0 | ○ |
| Sample 5 | 1.5 | ○ |
| Sample 6 | 1.6 | ○ |
| Sample 7 | Erasure impossible | x |
| Sample 8 | >10 | x |
| Sample 9 | Erasure impossible | x |
| Sample 10 | Erasure impossible | x |
| Sample 11 | Recording impossible | x |

When a signal was recorded at 2x speed, "erasure impossible" was entered in the amount of degradation in jitter section of the table for the sample from which erasure could not be carried out because the linear velocity of the medium was too slow, and "recording impossible" was entered in the amount of degradation in jitter section of the table for the sample on which the signal could not be recorded at 2x speed because the linear velocity of the medium was too fast. Since the amount of degradation in the jitter of these samples could not be measured. Since the amount of degradation in jitter of the sample 8 was more than 10%, ">10" was entered in the section of the table.

According to Table 4, it was found that samples 1 to 6 in which the composition of the recording film material was within the ranges of $5 \leq y \leq 15$, $5 \leq z \leq 15$, and $a \leq 15$ had superior reproduction durability. Also, according to the results of samples 1 to 4, it was found that the amount of degradation in jitter exhibited the relationship of sample 1>sample 2>sample 3=sample 4. Therefore, it was found that degradation in jitter at a high reproduction power was reduced when the amount of In was increased.

Finally, jitter was measured when a signal was recorded at 2x speed while varying the multi-pulse (Tmp) width of the recording strategy. Table 5 shows the jitters when the Tmp width is 3.375 nsec. In Table 5, a circle indicates a sample having a jitter of 8.5% or less, and a cross indicates a sample having a jitter of more than 8.5%.

TABLE 5

|  | Tmp margin | |
| --- | --- | --- |
|  | Jitter(%) | Evaluation |
| Sample 1 | 7.5 | ○ |
| Sample 2 | 6.6 | ○ |
| Sample 3 | 6.8 | ○ |
| Sample 4 | 7.1 | ○ |
| Sample 5 | 9.5 | x |
| Sample 6 | 9.2 | x |
| Sample 7 | Erasure impossible | x |
| Sample 8 | 7.8 | ○ |
| Sample 9 | Erasure impossible | x |
| Sample 10 | Erasure impossible | x |
| Sample 11 | Recording impossible | x |

Jitter could not be measured for the sample from which a signal could not be erased, and, therefore "erasure impossible" was entered in the jitter section of the table. According to Table 5, it was found that samples 1 to 4 in which the composition of the recording film material was within the ranges of $5 \leq y \leq 15$, $5 \leq z \leq 15$, and $4 \leq a \leq 15$ had favorable jitter values. It was also found that the higher the amount of In, the more favorable the jitter value became, even if the pulse width was wide.

Table 6 shows an overall evaluation in which evaluation results according to every evaluation method are summarized. In the overall evaluation table, a circle indicates a sample which has passed all the evaluations regarding the linear velocity, the reproduction durability, and the Tmp margin of the jitter, and a cross indicates a sample which has failed even one of these evaluations.

TABLE 6

|  | Linear velocity | Reproduction durability | Tmp margin | Overall evaluation |
| --- | --- | --- | --- | --- |
| Sample 1 | ○ | ○ | ○ | ○ |
| Sample 2 | ○ | ○ | ○ | ○ |

TABLE 6-continued

|  | Linear velocity | Reproduction durability | Tmp margin | Overall evaluation |
| --- | --- | --- | --- | --- |
| Sample 3 | o | o | o | o |
| Sample 4 | o | o | o | o |
| Sample 5 | o | o | x | x |
| Sample 6 | o | o | x | x |
| Sample 7 | x | x | x | x |
| Sample 8 | o | x | o | x |
| Sample 9 | x | x | x | x |
| Sample 10 | x | x | x | x |
| Sample 11 | x | x | x | x |

According to Table 6, it was found that in samples 1 to 4, or in other words, when the composition of the recording film material was within the ranges of $5 \leq y \leq 15$, $5 \leq z \leq 15$, and $4 \leq a \leq 15$, it was possible to actualize a next-generation optical recording medium which had good reproduction durability and a good recording strategy margin.

As described above, when the value of a is small, the Tmp margin worsens. When the value of a is too large, a signal cannot be rewritten at 2× speed because the erasability is reduced. When the value of y is small, the reproduction durability is reduced. When the value of y is too large, a signal cannot be rewritten at 2× speed because the erasability is reduced. Furthermore, when the value of z is small, the crystallization rate becomes too fast and it becomes difficult to form a mark at 2× speed. When the value of z is too large, a signal cannot be rewritten at 2× speed because the erasability is reduced.

Figure 3:
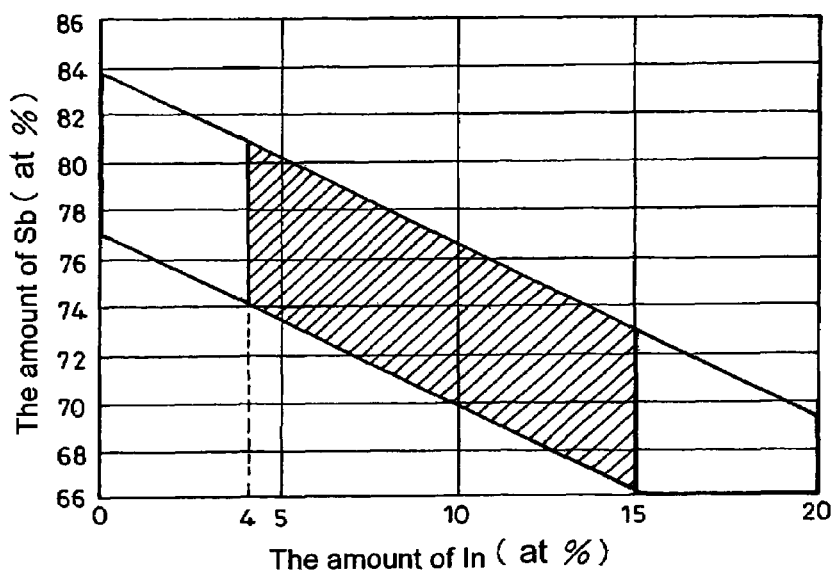
FIG. 3 is a graph which shows the relationship between the amount (a) of In and the amount (x) of Sb in the translucent information layer used in the optical recording medium according to the first exemplary embodiment of the present invention.

According to the results of the aforementioned evaluations and other experiments undertaken by the inventor, it was found that when the value of b was within the confines of $77 \leq b \leq 84$, it was possible to actualize a next-generation optical recording medium having good reproduction durability and a good recording strategy margin. FIG. 3 is a graph showing the relationship between the amount (a) of In and the amount (x) of Sb when the value of b is within the aforementioned range. In FIG. 3, as with FIG. 2, the horizontal axis corresponds to the amount (a) of In and the vertical axis corresponds to the amount (x) of Sb, and straight lines indicate the relationship between the amount (a) of In and the amount (x) of Sb in the cases of b=77 and 84. The area surrounded by the two straight lines corresponds to $77 \leq b \leq 84$. Furthermore, according to the results of the aforementioned evaluations, the optical recording medium according to the first exemplary embodiment of the present invention exhibits favorable results in the range of $4 \leq a \leq 15$. Thus, the ranges of $4 \leq a \leq 15$ correspond to the diagonally shaded area shown in FIG. 3.

The optical recording medium according to the first exemplary embodiment of the present invention may be provided with a protective layer 36 on only one side of the recording film 18. In this case, the protective layer 36 may be provided on the recording film 18 on the side of the light incident surface on which the laser beam is incident or only on the opposite side of the light incident surface.

FIRST COMPARATIVE EXAMPLE

Sample 12 which has the recording film which composition is identical to the composition of the recording film of sample 2 of first exemplary embodiment, and which has no heat sink layer 34, and which has the second dielectric layer 32 which thickness is 40 nm, was manufactured. The linear velocity of sample 12 was obtained in a manner similar to the manner of the first exemplary embodiment. The linear velocity of sample 12 is identical to the linear velocity of sample 2.

Then, the reproduction durability was evaluated in a manner similar to the manner of the first exemplary embodiment. In sample 12, the signal was erased because an amorphous mark was crystallized by reproducing ten thousand times at 2× speed at a reproduction power Pr=1.0 mW. And the degradation in the jitter was confirmed by reproducing ten thousand times at 2× speed at a reproduction power Pr=0.7 mW. Thus, determination of sample 12 is a cross by an evaluation similar to the evaluation indicated on table 3.

As mentioned, it was found that the presence of the heat sink layer 34 which composes AlN film contributes to improvement of a reproduction durability of a optical recording medium. Thus, it was found that the heat sink layer 34 is essential to the second information layer.

SECOND COMPARATIVE EXAMPLE

The reproduction durability of samples 1 to 6 and 8 of first exemplary embodiment was evaluated by radiating the reproduction light in the following condition of High Frequency Modulation. The condition of High Frequency Modulation of second comparative example is a frequency of 400 MHz, a ratio of 6.0, and a pulse width of 220 psec at at a reproduction power Pr=0.7 mW. The ratio width and the pulse width of this condition of High Frequency Modulation are narrower than the ratio width and the pulse width of the condition of High Frequency Modulation of first exemplary embodiment. The conclusion of evaluating the reproduction durability indicates no degradation in the jitter by reproducing ten thousand times at 2× speed at a reproduction power Pr=1.0 mW and by reproducing ten thousand times at 2× speed at a reproduction power Pr=0.7 mW.

Thus, the degradation in reproduction does not occur if the ratio width and the pulse width of the condition of High Frequency Modulation are narrow. But the signal characteristic of the reproduction light degenerates by being influenced of laser noise. And the degradation in reproduction does not occur if the ratio width and the pulse width of the condition of High Frequency Modulation are thick, but, as mentioned above, the restriction of the circuit of High Frequency Modulation makes a request the higher limit of the condition of High Frequency Modulation is a frequency of 500 MHz, a ratio of 8.0, and a pulse width of 350 psec. If the condition is configured over this limit, the degradation in reproduction is noteworthy.

Second Exemplary Embodiment

Samples 13 to 17 which has the recording film which composition is identical to the composition of the recording film of sample 2 of first exemplary embodiment, and which has an interface layer thickness of which differ from the thickness of the interface layer 36 of sample 2, were manufactured. The linear velocity of these samples was obtained in a manner similar to the manner of the first exemplary embodiment. And the reproduction durability was obtained by reproducing in a manner similar to the manner of the first exemplary embodiment, and a circle indicates sample that does not exhibit any degradation in jitter when reproduction at 2× speed was carried out ten thousand times at a reproduction power Pr=0.7 mW, and a cross indicates a sample exhibiting jitter degradation. Table 7 shows the conclusion. In Table 7, similar to Table 4, when a signal was recorded at 2× speed, "erasure impossible" was entered in evaluation of reproduction durability section of the table for sample 13 from which erasure could not be carried out because the linear velocity of the medium was too slow.

TABLE 7

|  | Thickness of the interface layer (nm) | Linear velocity (m/s) | Evaluation of reproduction durability |
|---|---|---|---|
| Sample 13 | 0 | 9.4 | Erasure impossible |
| Sample 14 | 1 | 13.4 | x |
| Sample 15 | 2 | 13.8 | o |
| Sample 16 | 3 | 14.0 | o |
| Sample 17 | 10 | 15.0 | o |

According to Table 7, it was found that from sample 13, thickness of which interface layer 36 is 0 nm, that is to say, which has no interface layer, a signal could hard be erased, and evaluation of reproduction durability could not be carried out. And it was found that from sample 14, thickness of which interface layer 36 is 1 nm, it can be assured that a linear velocity at which a signal can be erased at 2× speed because the crystallization rate is advanced, but degradation in reproduction occurred. And it was found that from sample 15, thickness of which interface layer 36 is 2 nm, from sample 16, thickness of which interface layer 36 is 3 nm, and from sample 17, thickness of which interface layer 36 is 10 nm, it can be assured that a linear velocity at which a signal can be erased, and degradation in reproduction does not occurred. Thus, the lower limit of thickness of interface layer 36, at which a linear velocity at which a signal can be erased and reproduction durability is assured, is 2 nm. And the higher limit of thickness of interface layer 36 is 10 nm from the viewpoint of time of making a film and mass productivity.

Accordingly, it was found that it is difficult to fit the crystallization rate and reproduction durability of the second information layer 16 to recording at 2× speed and reproduction at 2× speed only by the composition of the recording film.

Third Exemplary Embodiment

Samples 18 to 21 which has the recording film which composition is identical to the composition of the recording film of sample 2 of first exemplary embodiment, and which has an interface layer thickness of which is 5 nm, and compositional ratios of the $ZrO_2$—$Cr_2O_3$ film which makes the interface layer differ from the compositional ratios of the $ZrO_2$—$Cr_2O_3$ film which makes the interface layer 36 of sample 2, were manufactured. $ZrO_2$ used here is a stabilized $ZrO_2$ which compositional ratios are $ZrO_2$:$Y_2O_3$=97:3 (mol %), thus, the stabilized $ZrO_2$ includes $Y_2O_3$ at 3 mol %. The linear velocity of these samples was obtained in a manner similar to the manner of the first exemplary embodiment. The linear velocity of every sample was over 12 m/s, and a signal could be erased at 2× speed. And the reproduction durability was obtained by reproducing in a manner similar to the manner of the first exemplary embodiment, and a circle indicates sample that does not exhibit any degradation in jitter when reproduction at 2× speed was carried out ten thousand times at a reproduction power Pr=0.7 mW, and a cross indicates a sample exhibiting jitter degradation. Table 8 shows the conclusion. In Table 8, "film defect" was entered in reproduction durability section of the table for sample on the interface layer 36 made of which, there is many film defects.

TABLE 8

|  | $ZrO_2$:$Cr_2O_3$(mol %) | Reproduction durability |
|---|---|---|
| Sample 18 | 100:0 | x |
| Sample 19 | 90:10 | o |
| Sample 20 | 20:80 | o |
| Sample 21 | 0:100 | Film defect |

According to Table 8, it was found that in sample 18, which has an interface layer 36 made of the $ZrO_2$—$Cr_2O_3$ film which compositional ratios are $ZrO_2$:$Cr_2O_3$=100:0 (mol %), that is to say, only made of stabilized $ZrO_2$, jitter degradation occurred. And in sample 21, which has an interface layer 36 which compositional ratios are $ZrO_2$:$Cr_2O_3$=0:100 (mol %), that is to say, only made of $Cr_2O_3$, there is many film defects, and a practical issue may occur. And it was found that in sample 19, which has an interface layer 36 which compositional ratios are $ZrO_2$:$Cr_2O_3$=90:10 (mol %), and in sample 20, which has an interface layer 36 which compositional ratios are $ZrO_2$:$Cr_2O_3$=20:80 (mol %), jitter degradation did not occur.

Accordingly, it was found that positive compositional ratios of $ZrO_2$ and $Cr_2O_3$ in the $ZrO_2$—$Cr_2O_3$ film are the C satisfies $20 \leq C \leq 90$, and the D satisfies $10 \leq D \leq 80$, and the C and the D satisfy C+D=100 when $ZrO_2$:$Cr_2O_3$=C:D (mol %) holds.

Fourth Exemplary Embodiment

Samples which have the recording film which composition is identical to the composition of the recording film of sample 2 of first exemplary embodiment, and which has a recording film thickness of which differ from the thickness of the recording film 18 of sample 2, were manufactured. It was difficult to record because crystallization rate was too fast when thickness of the recording film was 8 nm. And it was difficult to erase a signal because crystallization rate was too slow when thickness of the recording film was 2 nm.

Accordingly, it was found that the positive thickness of recording film 18 is in a range of from 3 nm to 7 nm both inclusive.

Fifth Exemplary Embodiment

Samples 22 to 26 which has the recording film which composition is identical to the composition of the recording film of sample 2 of first exemplary embodiment, and which has a reflective layer thickness of which differ from the thickness of the reflective layer 28 of sample 2, were manufactured. The reproduction durability and Tmp margin of jitter of the samples was evaluated in a manner similar to the manner of the first exemplary embodiment. Table 9 shows the conclusion.

TABLE 9

|  | Thickness of the reflective layer (nm) | Tmp margin | Reproduction durability |
|---|---|---|---|
| Sample 22 | 6 | x | o |
| Sample 23 | 8 | o | o |
| Sample 24 | 12 | o | o |
| Sample 25 | 16 | o | o |
| Sample 26 | 20 | o | x |

According to Table 9, it was found that in sample 22, which has a reflective layer thickness of which is 6 nm, reproduction durability was good because the reflective layer was thin, and light transmittance was high, but Tmp margin indicated a cross because radiation performance became worse. And it was found that in sample 26, which has a reflective layer thickness of which is 20 nm, Tmp margin was good because the reflective layer had good radiation performance, but reproduction durability indicated a cross because light transmittance became worse and recording property of the first information layer 14 became worse because light transmittance became worse. And it was found that in sample 23, which has a reflective layer thickness of which is 8 nm, in sample 24, which has a reflective layer thickness of which is 12 nm, and in sample 25, which has a reflective layer thickness of which is 16 nm, reproduction durability and Tmp margin indicated a circle.

Accordingly, it was found that the positive thickness of reflective layer 28 is in a range of from 8 nm to 16 nm both inclusive.

The aforementioned exemplary embodiment from first to fifth relates to the optical recording medium having two information layers and to the recording film material for an optical recording medium used therein, but it should be understood that the present invention is not limited thereto. The present invention is also applicable to an optical recording medium having three or more information layers and to a recording film material for an optical recording medium used therein.

What is claimed is:

1. An optical recording medium comprising:
   a substrate;
   a first information layer which is provided on the substrate on a side of a light incident surface on which a laser beam is incident;
   at least one translucent information layer which is provided further on the side of the light incident surface than the first information layer; and
   a spacer layer being provided between the first information layer and the translucent information layer, wherein
   the translucent information layer is configured to include a first dielectric layer, a reflective layer, a protective layer, a recording film, an interface layer provided adjacent to the recording film on the side of the light incident surface, and a second dielectric layer, which are formed in this order from the spacer layer side,
   the recording film which is made of a phase change material having $Sb_xTe_yGe_z$ elements and specific elemental ratios,
   the y holds $5 \leq y \leq 15$, z holds $5 \leq z \leq 15$,
   NA represents the numerical aperture of an objective lens, and $\lambda$ represents a wavelength of the laser beam, the recording film is rewritable using an optical system of $\lambda/NA \leq 650$ nm,
   when $x+y+z+a=100$ holds by adding In with an elemental ratio of a, $4 \leq a \leq 15$ holds, and
   the translucent information layer is provided with a heat sink layer on the side of the light incident surface of the second dielectric layer.

2. The optical recording medium according to claim 1, wherein when $77 \leq b \leq 84$ holds, the elemental ratios x and a satisfy $x=-0.713 \times a + b$.

3. The optical recording medium according to claim 1, wherein the recording film has a thickness in a range of from 3 nm to 7 nm both inclusive.

4. The optical recording medium according to claim 2, wherein the recording film has a thickness in a range of from 3 nm to 7 nm both inclusive.

5. The optical recording medium according to claim 1, wherein the reflective layer has a thickness in a range of from 8 nm to 16 nm both inclusive.

6. The optical recording medium according to claim 1, wherein the interface layer contains at least Cr and O.

7. The optical recording medium according to claim 1, wherein the heat sink layer comprises an AlN film.

8. The optical recording medium according to claim 1, wherein the interface layer is made of $ZrO_2$—$Cr_2O_3$ film, and the $ZrO_2$—$Cr_2O_3$ film has a thickness in a range of from 2 nm to 10 nm both inclusive.

9. The optical recording medium according to claim 8, wherein when $ZrO_2:Cr_2O_3=C:D$ (mol %), the compositional ratios $ZrO_2$ and $Cr_2O_3$ in the $ZrO_2$—$Cr_2O_3$ film, holds, the C satisfies $20 \leq C \leq 90$, and the D satisfies $10 \leq D \leq 80$, and the C and the D satisfy $C+D=100$.

10. The optical recording medium according to claim 8, wherein the $ZrO_2$ is stabilized $ZrO_2$ which contains $Y_2O_3$, when $ZrO_2:Y_2O_3=(100-X):X$ (mol %), the compositional ratios $ZrO_2$ and $Y_2O_3$ in the stabilized $ZrO_2$, holds, the X satisfies $2 \leq X \leq 10$.

11. An optical recording medium comprising:
    a substrate;
    a first information layer which is provided on the substrate on a side of a light incident surface on which a laser beam is incident;
    at least one translucent information layer which is provided further on the side of said light incident surface than the first information layer; and
    a spacer layer being provided between the first information layer and the translucent information layer, wherein
    the translucent information layer is configured to include a first dielectric layer, a reflective layer, a protective layer, a recording film, an interface layer provided adjacent to the recording film on the side of the light incident surface, and a second dielectric layer, which are formed in this order from the spacer layer side,
    the recording film which is rewritable using an optical system of $\lambda/NA \leq 650$ nm when NA represents the numerical number of an objective lens and $\lambda$ represents a wavelength of the laser beam; and a protective layer adjacent to the recording film on the side of the substrate side,
    the recording film is made of an Sb-based eutectic phase change material having Sb as a main composition and the protective layer contains at least Cr and O, and
    the translucent information layer is provided with a heat sink layer on the side of the light incident surface of the second dielectric layer.

12. The optical recording medium according to claim 1, wherein the material of the heat sink layer is a material with higher thermal conductivity than that of the second dielectric layer.

13. The optical recording medium according to claim 1, wherein thickness Theat of the heat sink layer is 15 nm $\leq$ Theat $\leq$ 150 nm.

14. The optical recording medium according to claim 1, wherein the heat sink layer comprises an AlN film.

15. The optical recording medium according to claim 11, wherein the material of the heat sink layer is a material with higher thermal conductivity than that of the second dielectric layer.

16. The optical recording medium according to claim 11, wherein thickness Theat of the heat sink layer is 15 nm $\leq$ Theat $\leq$ 150 nm.

17. The optical recording medium according to claim 11, wherein the heat sink layer comprises an AlN film.

* * * * *